United States Patent [19]
von Huene et al.

[11] Patent Number: 5,210,929
[45] Date of Patent: May 18, 1993

[54] METHOD OF MAKING A FERRITE CAPPED WINCHESTER-STYLE SLIDER

[75] Inventors: Marc J. von Huene, Goleta; Jerry C. Hanlon, Santa Barbara; David M. Sherwood, Oxnard, all of Calif.

[73] Assignee: Applied Magnetics Corporation, Goleta, Calif.

[21] Appl. No.: 671,199

[22] Filed: Mar. 18, 1991

[51] Int. Cl.⁵ ............................................. G11B 5/42
[52] U.S. Cl. ..................................... 29/603; 360/122
[58] Field of Search ................. 29/603; 360/103, 104, 360/122

[56] References Cited

U.S. PATENT DOCUMENTS

| | | | |
|---|---|---|---|
| 3,474,528 | 10/1969 | Walther et al. | 29/603 |
| 3,543,396 | 12/1970 | Illg et al. | 29/603 |
| 3,601,871 | 8/1971 | Pierce | 29/603 |
| 3,760,494 | 9/1973 | Lang, Jr. | 29/603 |
| 3,956,771 | 5/1976 | Barnes et al. | 29/603 X |
| 4,423,495 | 12/1983 | Musha et al. | |
| 4,425,636 | 1/1984 | Musha et al. | |
| 4,441,175 | 4/1984 | Shuman | |
| 4,453,239 | 6/1984 | Musha et al. | |
| 4,612,437 | 9/1986 | Ohsato | |
| 4,644,516 | 2/1987 | Musha | |
| 4,862,442 | 8/1989 | Tadokoro et al. | |
| 5,123,156 | 6/1992 | Meunier et al. | 29/603 |

OTHER PUBLICATIONS

Shannon, Robert R. and Wyant, James C., "Applied Optics and Optical Engineering", Optical Sciences Center, University of Arizona, Tucson, Ariz., vol. 9, (1983).
G. Bouwhuis, "Principles of Optical Disk Systems", Philips Research Laboratories, Eindhoven.
"Topical Meeting on Optical Data Storage", A Digest of Technical Papers Presented at the Topical Meeting on Optical Data Storage, Oct. 15–17, 1985, Washington Hilton Hotel, Washington, D.C.
Yamamoto et al., "Optical Pregroove Dimensions: Design Considerations", Applied Optics, vol. 25, No. 22, Nov. 15, 1986.
Musha et al., "An Optical Head for Digital Audio Disks", Research Department, Research & Development Division, Olympus Optical Company, Ltd., 2951, Ishikawa-Cho, Hachioji-Shi, Tokyo, Japan 192.

Primary Examiner—Carl E. Hall
Attorney, Agent, or Firm—Knobbe, Martens, Olson & Bear

[57] ABSTRACT

An improved slider and magnetic cap assembly which reduces flux loss which retards sensitivity in writing and reading in a magnetic head system. The slider incorporates a body, a partial core, a coil and a cap. The cap is mounted on the upper surface of the body and includes a first and second depending projection corresponding in shape and location to the generally U-shaped partial core so that the mating surfaces of the cap and the partial core mate directly. Another aspect is a similar slider assembly wherein the cap includes a film coil of electrically conductive material deposited around an area which mates with the partial core so that the flow of electrical current will induce magnetic flux through the core. Another aspect is a method of making a magnetic head slider wherein the back bar of a generally rectangular tube is removed and a partial core is sliced from the tube. The partial core is then mounted on a slider body and a pre-wound coil of electrically conductive material is mounted around one of the portions or legs of the partial core. A cap is then mounted on the upper surface of the body so that the cap directly contacts the partial core forming a continuous core. Another aspect is a method of making a magnetic head slider including the depositing of a film coil on the cap around one of the areas which mates with the partial core so that the flow of electrical current through the coil will induce magnetic flux through the core.

8 Claims, 10 Drawing Sheets

METHOD OF MAKING A FERRITE CAPPED WINCHESTER-STYLE SLIDER

FIELD OF THE INVENTION

This invention relates to a magnetic head slider, and more particularly, to a magnetic head slider for improving sensitivity and productivity in a magnetic head system while reducing the size of a magnetic head slider. More particularly, the present invention relates to an improved technique for increasing sensitivity and productivity by utilizing a ferrite cap which constitutes a core closure for a magnetic circuit and at the same time covers a magnetic head slider.

BACKGROUND OF THE INVENTION

In conventional magnetic head systems, the magnetic head consists of an electromagnetic arrangement for writing, reading or erasing data on a magnetizable storage medium, movable relative thereto, such as a magnetic disk. Typically, for use with a magnetic disk, the magnetic head is attached to a suspension and lies opposite the disk face.

Rotating magnetic disks of the type in which the magnetic head is in contact with the disk surface when the disk is at rest and flies above the disk surface when the disk is rotating at its operating speed are well known in the field. In such types of rotating magnetic disks, the magnetic head, which is supported on a suspension, rides on a cushion or bearing of air above the disk surface when the disk is rotating at its operating speed. The slider is movable radially on the disk to be positioned over a selected one of a group of concentric recording tracks. The slider is carried on a suspension assembly connected ultimately to an actuator.

Such magnetic head sliders commonly use a two piece core with the separate halves bonded together using high temperature glass. A coil is wound around one of the legs of the core to create magnetic flux. A gap is established using sputtering techniques causing the magnetic flux to radiate to the disc surface or to enable the magnetic flux on the surface of the disk to induce a current through the coil. Sliders of this geometric configuration leave a particular foot print, which has become a standard in the industry. The use of such two piece cores has two inherent disadvantages. First, the gap runs the entire length of the core thereby creating a back-gap in addition to the intended front-gap. The back-gap causes additional flux loss which hampers an improvement of magnetic head sensitivity in reading and writing. Second, once made, the core is a closed loop, and installation of the coil must be accomplished by winding wire through the open center of the core. Since this is done by hand with use of a microscope, this process involves a considerable amount of time and cost.

It is recognized that higher magnetic recording density requires correspondingly reduced disc-to-disc spacing or height of the slider. The need to wind magnetic wire through a coil window in the two piece core as above also puts constraints on the final size of the head assembly. As storage capacities increase, the size of the magnetic head has been reduced significantly. Further reduction, however, will be limited by the need to leave a winding area. Present day technology has brought us to a final head height of 0.024 inches, but only through technology changes will it be possible to reduce it further.

SUMMARY OF THE INVENTION

The present invention relates to an improved slider and magnetic head assembly which reduces flux loss which retards sensitivity in writing and reading in a magnetic head system. The present invention also includes an improved method of manufacturing magnetic head sliders. The present invention will enable the physical size of magnetic head sliders to be further reduced, thus enabling the further miniaturization of magnetic storage systems.

One aspect of the invention is a magnetic head slider for use in connection with a rotating magnetic medium including a body, a partial core, a coil and a cap. The body includes an upper surface, a lower surface, a leading edge and a trailing edge. The lower surface of the body defines a pair of air-bearing elements.

The partial core is generally U-shaped, including an I-shaped portion defining a top surface, and an L-shaped portion, including a horizontal section and a vertical section. The vertical section defines a top surface, and the I-shaped portion and the horizontal section of the L-shaped portion define a front gap. The partial core is supported by the body and a coil of electrically conductive material is mounted around one of the portions of the core.

A cap is mounted on the upper surface of the body and is sized and shaped to shield the partial core from magnetic flux. The cap includes a first depending projection defining a first bottom surface corresponding in size and shape to the top surface of the I-shaped portion, and a second depending projection defining a second bottom surface corresponding in size and shape to the top surface of the L-shaped portion. The first projection is positioned on the cap so that the first bottom surface mates directly with the top surface of the I-shaped portion when the cap is mounted on the upper surface of the body, and the second projection is positioned on the cap so that the second bottom surface mates directly with the top surface of the vertical section of the L-shaped portion when the cap is mounted on the upper surface of the body. The directly mating surfaces of the body and cap are lapped.

Another aspect of the invention is a magnetic head slider for use in connection with a rotating magnetic medium, including a body, a generally U-shaped partial core and a cap. The body includes an upper surface, a lower surface, a leading edge and a trailing edge, wherein the lower surface defines a pair of air-bearing ribs.

The core is generally U-shaped, including an I-shaped portion defining a top surface, and an L-shaped portion defining a horizontal section and a vertical section, wherein the vertical section defines a top surface. The I-shaped portion and the horizontal section of the L-shaped portion define a front gap and the partial core is mounted on the body. A cap is mounted on the upper surface of the body. The cap includes a first area which directly contacts the top surface of the I-shaped portion, and a second area which directly contacts the top surface of the vertical section of the L-shaped portion, thereby forming a continuous core through said horizontal section of said vertical section, the cap and the I-shaped portion around the front-gap. The cap further includes a film coil of electrically conductive material deposited around one of the areas so that the flow of electrical current through the coil will induce magnetic flux through the core.

Another aspect of the invention is a method of making a magnetic head slider. A hollow tube of generally rectangular cross section is formed from a generally C-shaped bar of magnetically conductive material and a generally I-shaped bar of magnetically conductive material so that the junction between the front of the bars forms a front-gap, and the junction between the back of the bars form a back-gap. All of the back of the hollow tube is removed at or above the junction between the back of the bars forming the back-gap, thereby forming a generally U-shaped bar. The U-shaped bar is sliced into a series of U-shaped partial cores, including a generally I-shaped portion defining a top surface and a generally L-shaped portion having a horizontal section and a vertical section, wherein the vertical section defines a top surface. At least one of the series of partial cores is mounted in a slider body having an upper surface, a lower surface, a leading edge and a trailing edge. A pre-wound coil of electrically conductive material is mounted around one of the portions, and a cap is mounted on the upper surface of the body so that the cap directly contacts the top surface of the I-shaped portion and the top surface of the vertical section of the L-shaped portion Thus, a continuous core from the vertical section of the L-shaped portion to the horizontal section of the I-shaped portion around the front gap is formed.

Another aspect of the invention is a method of making a magnetic head slider A hollow tube of generally rectangular cross section is formed from a generally C-shaped bar of magnetically conductive material and a generally I-shaped bar of magnetically conductive material. The junction between the front of the bars forms a front-gap, and the junction between the back of the bars forms a back-gap. All of the back of the hollow tube at or above the junction between the back of the bars forming the back-gap is removed thereby forming a generally U-shaped bar. The U-shaped bar is sliced into a series of U-shaped partial cores, including a generally I-shaped portion and a generally L-shaped portion, having a horizontal section and a vertical section, wherein the vertical section defines a top surface. At least one of the series of partial cores is mounted in a slider body having an upper surface, a lower surface, a leading edge and a trailing edge. A cap is mounted in the upper surface of the body so that a first area of the cap directly contacts the top surface of the I-shaped portion, and a second area of the cap directly contacts the top surface of the vertical section of the L-shaped portion. Thus, a continuous core is formed from the horizontal section of the L-shaped portion to the I-shaped portion around the front-gap. Prior to the mounting of the cap on the body, a film coil is deposited on the cap around one of the areas so that the flow of electric current through the coil will induce magnetic flux through the core.

The resulting effective core geometry assembly is the same as standard Winchester style core However, the unique structural configuration of the slider permits substantial savings in manufacturing costs, while the elimination of the back gap improves the head's performance.

In accordance with the other aspect of the present invention, a wire wound coil is entirely eliminated by using thin film or thick film techniques. A thin film or thick film coil can be deposited directly on the slider cap. This would allow for alternative core designs which would reduce the winding window to 0.003 inches, which in turn would allow for significantly reduced slider heights. This virtual elimination of the winding window will result in a slider configuration such that the resistance of the air bearing portions of the slider during the creation of the air bearing surfaces will be substantially uniform, thereby resulting in improved flatness of the air bearing surfaces. In addition, depositing coils onto the ferrite caps would greatly reduce the cost as well as allow for better quality.

DETAILED DESCRIPTION OF THE PREFERRED EMBODIMENT

Figure 1:
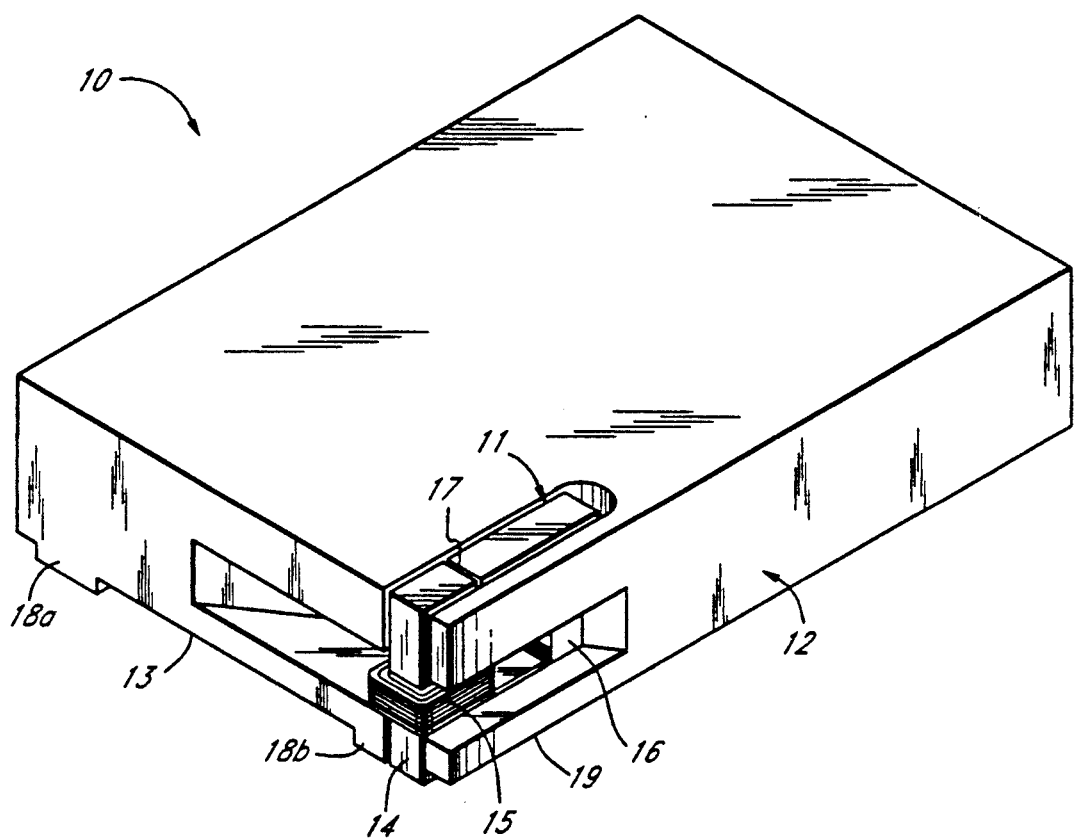
FIG. 1 is a perspective view of a conventional magnetic head slider having a standard composite core as a magnetic head.

FIG. 1 illustrates generally a conventional magnetic head slider 10. The slider 10 is comprised of a slider body 12, and a ferrite core The slider body 12 is commonly formed from a composite material such as calcium titinate while the core is typically made of ferrite. The slider 10 may also be formed as a single piece of polycrystal or single crystal ferrite. Any of the beforementioned type sliders 10 are exemplary of bulk type core sliders utilized by a floating-type magnetic head in a rigid magnetic disk drive. The ferrite core 11 is formed from an I-shaped portion 14 and a C-shaped portion 16 which are bonded together A recording medium such as a magnetic disk (not shown) rotates adjacent the bottom surface 13 of the slider body 12.

The bottom surface 13 defines a pair of parallel air bearing portions 18a, 18b or ribs which are spaced apart and extend in the rotating or sliding direction of the magnetic disk. A coil 15 is wound around the I-shaped portion 14 of the ferrite core 11 so that a current through the coil 15 may be used to generate magnetic flux or so that a magnetic field on the surface of the disk will induce a current through the coil 15. The magnetic flux is sensed at a front gap 19 provided underneath of the core. The ferrite core also has a back gap 17 at the opposite side of the front gap 19.

Figure 2:
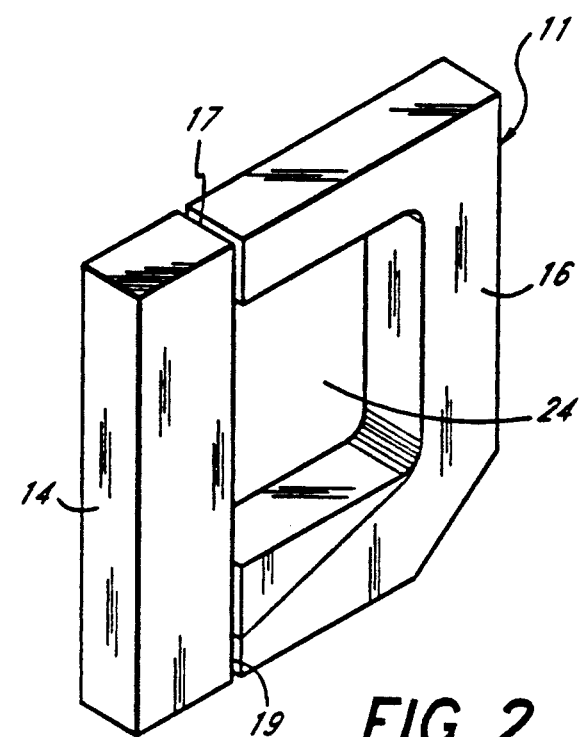
FIG. 2 is a perspective view of the standard composite core for the conventional magnetic head slider as illustrated in FIG. 1.

FIG. 2 shows the composite core 11 of the type used as an industry standard which is used in the magnetic head slider of FIG. 1. To maintain compatibility, industry has adopted standard cores. A single standard core will be used in a variety of geometric configurations of the magnetic head sliders so as to keep the same flux "footprint" (i.e., so that the core will generate the same flux field on the magnetic disk which will then be read the same by standard cores). If the geometric configuration of the core changes, the core's foot print will also change. The ferrite core 11 in FIG. 2 is an industry standard of the present day Winchester style sliders. The front gap 19 detects surface magnetic flux on magnetic media by a magnetic coupling between the front gap 19 and the corresponding magnetic tracks of the magnetic media. The front gap 19 also allows the magnetic flux to radiate from the core to the surface of the magnetic media.

In addition to creating the desired front gap, the standard composite core in FIG. 2 also has an undesirable back gap 17. The back gap 17 causes flux loss and thus causes decrease in sensitivity of the magnetic head. The effect of this additional flux loss has been greatly reduced by proper geometric forming of the core halves, or careful bonding to minimize the back gap 17, but has never been entirely eliminated.

The standard composite core of FIG. 2 has another disadvantage in that, once made, the core 11 is a closed loop, and installation of a coil must be accomplished by winding wire through the core window 24. Presently most window winding is done by hand and is one of the most expensive and difficult steps in building a head assembly, since the window 24 is very small. The need to a wind magnetic coil through the core window 24 also puts constraints on the final size of the head assembly. As storage capacities increase, the size of the head has been reduced significantly. However, further reduction of the head size is limited by the need to leave a winding area.

Figure 3:
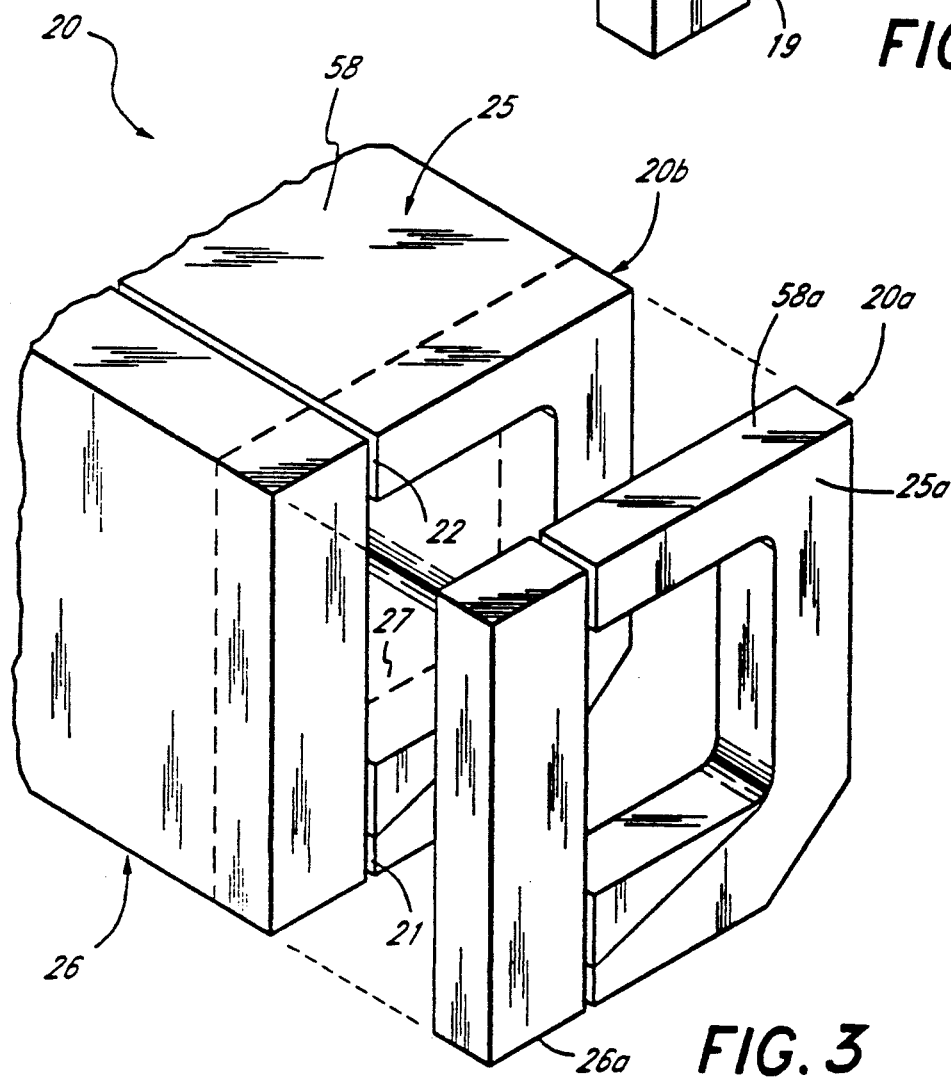
FIG. 3 is a perspective view illustrating the attachment and slicing of separate solid ferrite bars to form a standard composite core shown in FIG. 1.

The production cost of the magnetic head is one of the most important factors in the production of the magnetic head. To increase productivity and thus reduce cost, the standard composite core of FIG. 2 is made as shown in FIG. 3. A C-shaped ferrite bar 25 and an I-shaped ferrite bar 26 are bonded together under high temperature environment, such as a high temperature oven by means of sputtering the ends of the bars with a high temperature glass, putting the bars in a clamp and putting the clamped pieces in a high temperature oven until a sweat bond is formed. As discussed above, this creates a desired front gap 21 and an undesired back gap 22. This bonding is a delicate procedure since the gap size is extremely small and a considerable amount of accuracy in the size of the front gap 21 is required. Further, the glass between the gaps changes size during the process. Therefore, as is known in the art, the bonding process requires complicated technique and a long experience.

Next, a rod of low-temperature glass is inserted within the opening formed between the C-shaped bar 25 and the I-shaped bar 26 adjacent the front gap 21. The bars and rod are then placed in a lower temperature oven until the rod melts, forming a reinforcing wedge 27 proximate the front gap 21. After the C-shaped bar 25 and an I-shaped bar 26 are bonded together, forming a hollow reinforced tube 20 of generally rectangular cross-section, the surface of the I-shaped bar 26 opposite the C-shaped bar 25 is mounted flat against a sheet of substrate (not shown). The substrate and the bonded tube 20 are then sliced into small cores of predetermined thickness "t". The substrate provides a means of handling the minute cores without loss or damage.

As a result, a first standard composite ferrite core 20a having an I-shaped portion 26a and a C-shaped portion 25a is cut out, and then a second standard composite ferrite core having I-shaped portion 26b and C-shaped portion 25b is cut out, and so on to make a plurality of the standard cores.

Due to the extreme heat of the process of binding the C-shaped ferrite bar to the I-shaped bar 26, which forms the winding window 24 of the composite core, it is not possible to insert a pre-wound coil over the leg of the C-shaped or I-shaped bar before the closed loop is formed.

Preferred Embodiment

Figure 4:
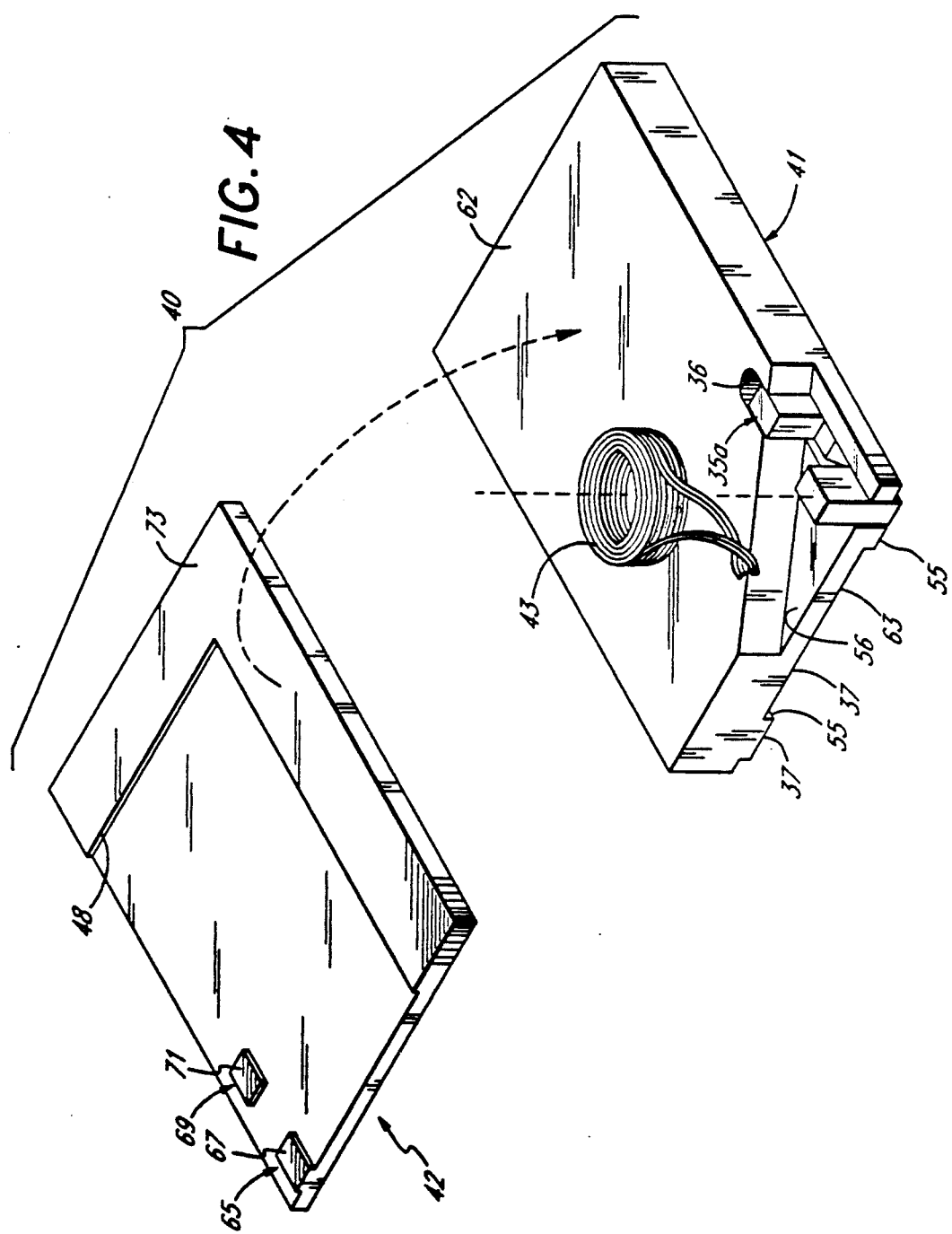
FIG. 4 is a perspective view of a magnetic head slider in accordance with a preferred embodiment of the present invention.

FIG. 4 shows a preferred embodiment of the magnetic head slider 40 present invention. Desirably, the magnetic head slider 40 defines an effective core geometry which is identical to that of the standard composite core of FIG. 2, so as to produce the same footprint as industry standard cores.

The magnetic head slider 40 includes a partial core 35a, a coil 43, a slider body 41 and a slider cap 42. The generally U-shaped partial core 35a is secured within an elongate notch 36 in the slider body 41 near one corner of the slider's leading edge 37. The initial steps in manufacturing the core 35a of the present invention are identical to the steps described above in connection with the prior art through the forming of a hollow tube of generally rectangular cross-section.

Figure 5:
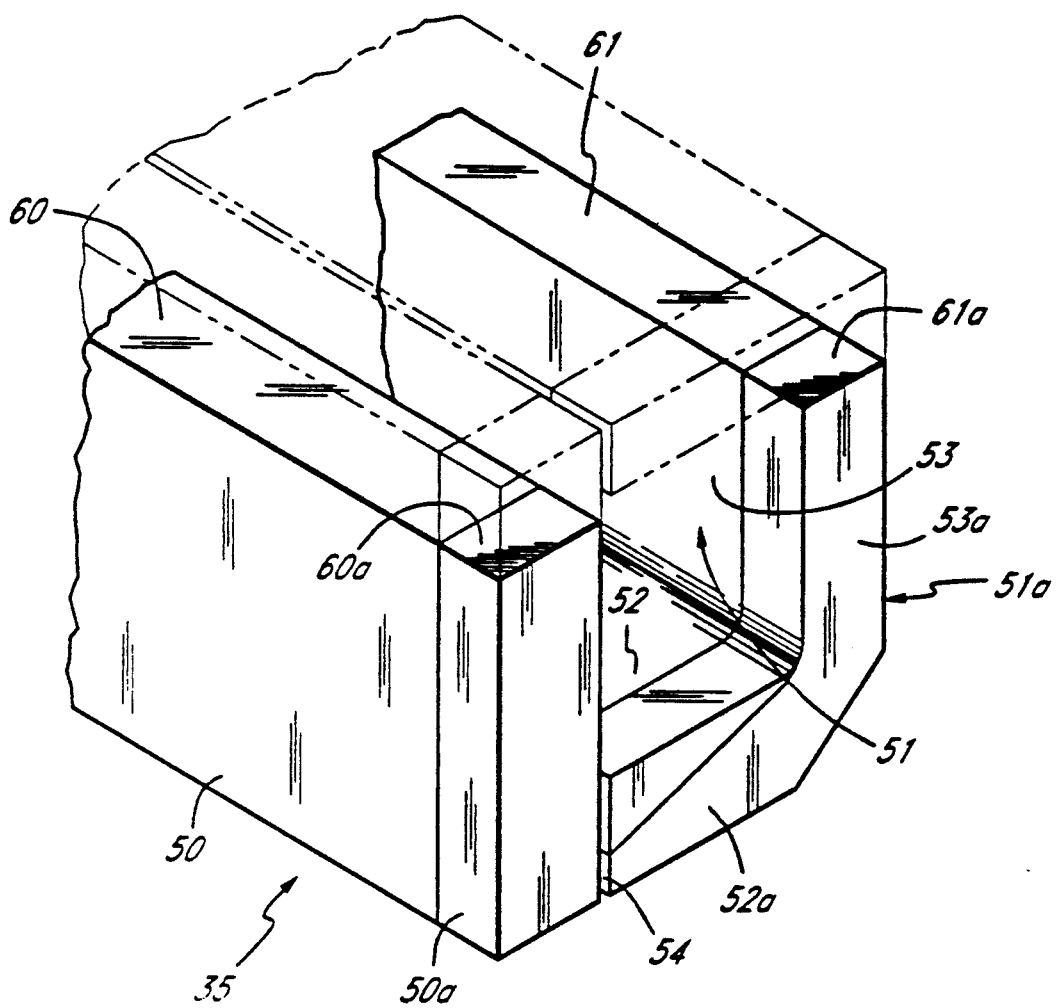
FIG. 5 is a perspective view of a standard composite core whose back bar portion is eliminated to be used in a preferred embodiment of the present invention.

As illustrated in FIG. 3, the hollow reinforced tube 20 is formed by the I-shaped bar 26, the C-shaped bar 25 and the reinforcing wedge 27, forming the front gap 21 of the tube 20 and the back gap 22 of the tube 20. The surface of the I-shaped bar 26 opposite the C-shaped bar 25 is then mounted flat against a sheet of substrate (not shown). Now, however, instead of simply slicing the tube 20 into pieces, the back side 58 (i.e., the side of the tube 20 having the back gap) is ground away until enough of the back bar of the tube 20 is eliminated so that those portions of the I-shaped bar 26 and the C-shaped bar 25 which had formed the back gap 22 are ground away. The tube can be trimmed by means of a grinder, a laser cutter, or other suitable means. Preferably, as illustrated in FIG. 5, the entire back bar is eliminated so that a U-shaped bar 35 formed by an I-shaped bar 50 and an L-shaped bar 51 having a horizontal leg 52 and a vertical leg 53 remains, with the upper portion of the vertical leg 53 of the L-shaped bar having a generally uniform cross-section. As will be appreciated, this generally uniform cross-section is desirable to avoid deviation from the standard effective geometric configuration of the core. As will be appreciated, the bar 35 will continue to define a front gap 54, while the I-shaped bar will form a first top surface 60 and the vertical leg 53 of the L-shaped bar 51 will form a second top surface 61. After the back bar is removed, the substrate and bar 35 are then sliced into small cores of predetermined thickness. A first core 35a formed from an I-shaped portion 50a (having a top surface 60a) and an L-shaped portion 51a (having a top surface 61a) and defining a first gap 54a is cut out, and then a second core 35b is cut out, and so on, to make a plurality of cores.

Referring again to FIG. 4, the slider body 41 is generally rectangular in shape, having a flat upper surface 62 and a lower surface 63 defining a recessed portion between two parallel air bearing portions 55 or ribs At one corner of the slider body is a generally rectangular cut out 56 intersecting the notch 36. The elongate axis of the notch runs parallel to the longitudinal edge of the slider and parallel to the air bearing ribs 55. In this position, the bottom surface of the core 35a, and thus the bottom of the core's front gap, is parallel to the bottom of the air bearing portion 55. Once the core 35a is mounted within the notch 36, a coil 43 is simply placed over the exposed I-shaped portion 50a of the core 35a before the cap 42 is placed on the slider body.

As best seen in FIG. 4, the cap 42 comprises a thin, generally rectangular sheet corresponding in size to the slider body 41. Positioned proximate one corner of the cap 42 is a first depending rectangular projection 65 defining a first lapped bottom surface 67 and a second depending rectangular projection 69 defining a second lapped bottom surface 71. The projections 65, 69 are positioned, sized and shaped so as to form a bar of continuous cross-section with the I-shaped portion 50a and L-shaped portion 51a of the core 35a when the cap 42 is placed over the slider body. Desirably, the cap includes a generally L-shaped ridge 48 extending along the side of the cap and the end of the cap distal the raised projections. When the cap is secured to the slider body with the bottom surfaces 67, 71 of the projections 65, 69 flush against the top surfaces 60a, 61a of the U-shaped core 35, the ridge 48 is desirably in direct contact with the upper surface 62 of the slider body. Although the ridge 48 may take a number of different shapes, it is desirable that the ridge be formed so that the cap cannot rock from end to end or side to side, thereby creating a space between the lapped bottom surfaces 65, 69 of the slider cap and the lapped top surfaces 60a, 61a of the U-shaped core 35a. As will be appreciated by those in the art, it is not necessary for the depending projections 65, 69 and the ridge 48 to be of identical height, so long as the height of the core 35a is such that the bottom surface 67, 71 of the projections 65, 69 will be in flush contact with the top surfaces 60a, 61a of the core when the cap 42 is placed over the slider body 41. Desirably, however, the height of the projections 65, 69 and the ridge 48 are equal in that this renders it a simpler matter to control the relative heights of the ridge 48 and the projections 65, 69. As will be readily appreciated by those of skill in the art, it is desirable to lap the mating surface 73 of the ridge 48 at the same time as the bottom surfaces 67, 71 of the core. Once the cap 42 is properly positioned against the slider body 41, the cap 41 is secured to the slider body 42 by adhesive or other supple means. Advantageously, the adhesive can be inserted within the cavity formed between the cap and the slider body distal the core and the ridge 48, to prevent the adhesive from affecting the core or affecting the mating of the lapped surfaces.

Preferably, the slider body 12 is made of calcium titinate and the cap 42 is made of ferrite, however either or both pieces could be formed of polycrystal or single crystal ferrite.

Since the bottom surfaces 67, 71 of the depending projections 65, 69 and the top surfaces 60a, 61a of the core are in direct contact, the flux loss caused at the back gap (which is, in fact, virtually eliminated) is significantly reduced, bringing about an increase in the sensitivity of the magnetic head slider.

Notably, the unique structural configuration of the magnetic head slider and the process for making the slider permit significant time savings as pre-wound coils can be quickly and easily inserted over the exposed I-shaped portion 50a of the core, rather than painstakingly wrapping the core through the window 24 as in the prior art.

Since the ferrite core cap 42 covers the entire slider body 41 as described above, the ferrite cap 42 also acts as a magnetic shield on the magnetic slider, thereby reducing the noise level of the magnetic head. Therefore, the magnetic head slider in accordance with the present invention will improve product performance while simultaneously reducing manufacturing costs. The resulting head assembly is the same size as the standard Winchester style magnetic head.

The magnetic head slider in accordance with the present invention may be either composite type or monolithic type. The monolithic type slider is made of a single crystal ferrite or polycrystalline ferrites Magnetic alloys can also be used for magnetic slider, however, the ferrite materials are preferable, since the resistivity of ferrite materials is at least three orders of magnitude greater than that of most metallic magnetic materials, so that eddy currents and associated permeability losses are relatively small. As ferrite materials, a combination of cores and slider bodies made with manganese-zinc (MnZn) and caps made with manganese-zinc (MnZn) or nickel-zinc (NiZn) is preferable. Another example is a combination of cores and slider bodies made with nickel-zinc (NiZn) and caps made with manganese-zinc (MnZn) or nickel-zinc (NiZn).

Due to the decreased back gap on the ferrite capped head slider 40, the inductance is increased for the same number of coil turns. By a static measurement of the inductance of a given core when wound with a magnetic wire coil, the inductance in accordance with the present invention is more than 10% higher than that of the conventional head slider, indicating a more efficient magnetic path.

Figure 6:
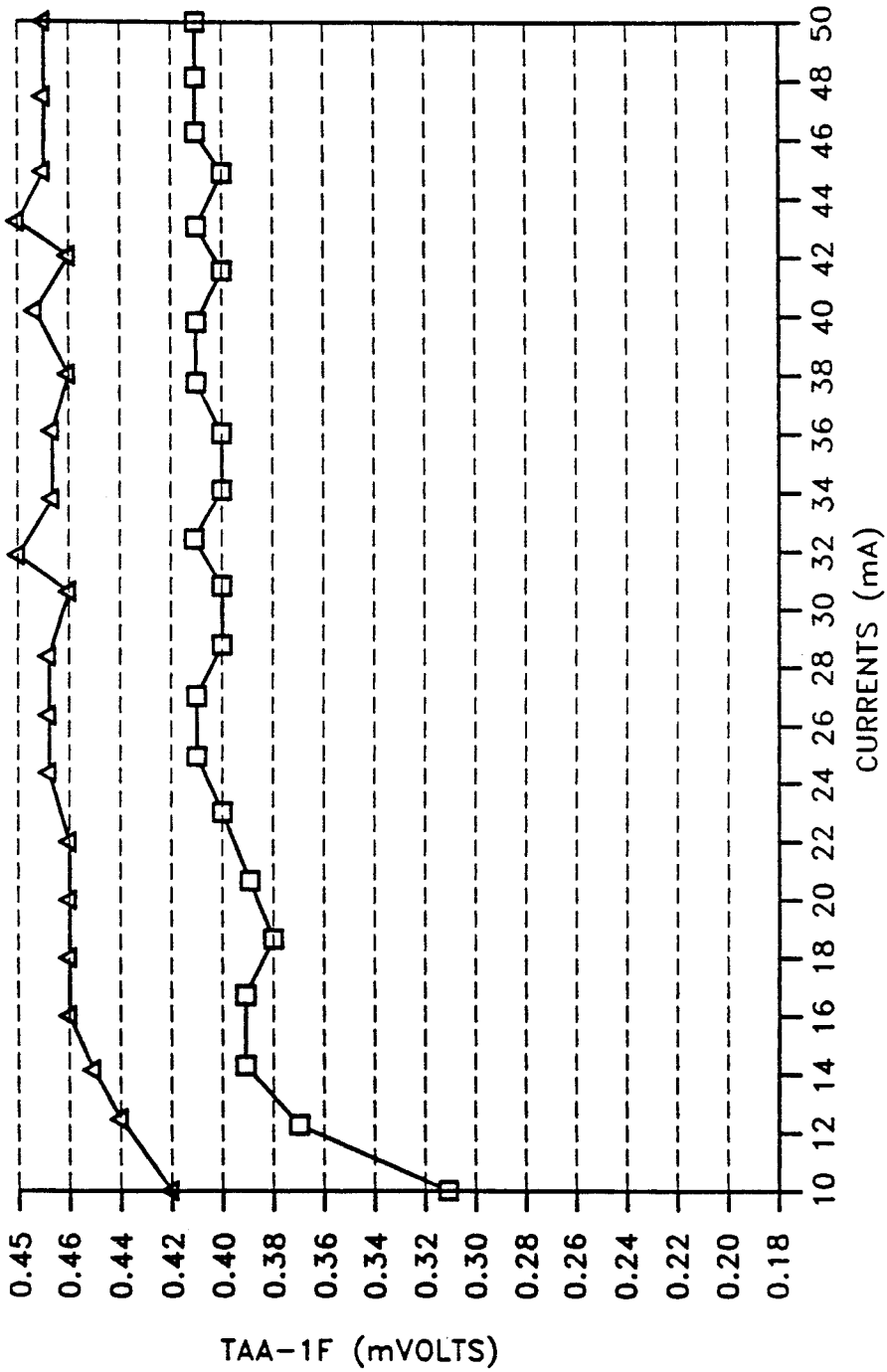
FIG. 6 is a graphical representation illustrating an improvement in output voltage level derived from the magnetic head for given input current of predetermined frequency.
Figure 7:
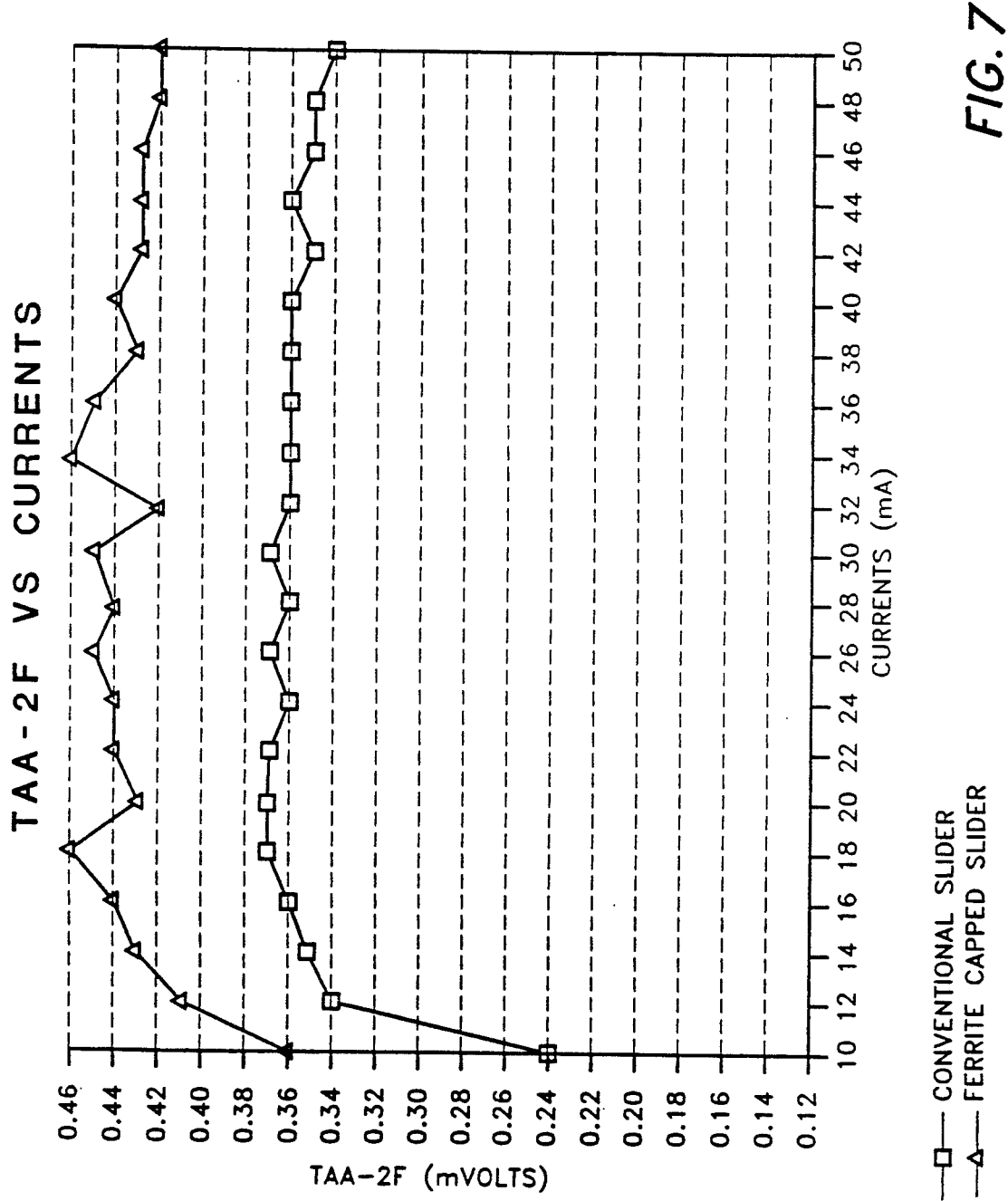
FIG. 7 is a graphical representation illustrating an improvement in output voltage derived from the magnetic head for given input current of two times higher frequency than that of FIG. 6.

FIGS. 6 and 7 show test results of measurements of the head output for given input current. The frequency 2F of the input current in FIG. 7 is two times higher that the frequency F in FIG. 6. The higher the output voltage indicates the better sensitivity of the magnetic head. The ferrite capped head slider in accordance with the present invention shows better performance than the conventional head slider both in FIG. 6 and FIG. 7.

Figure 8:
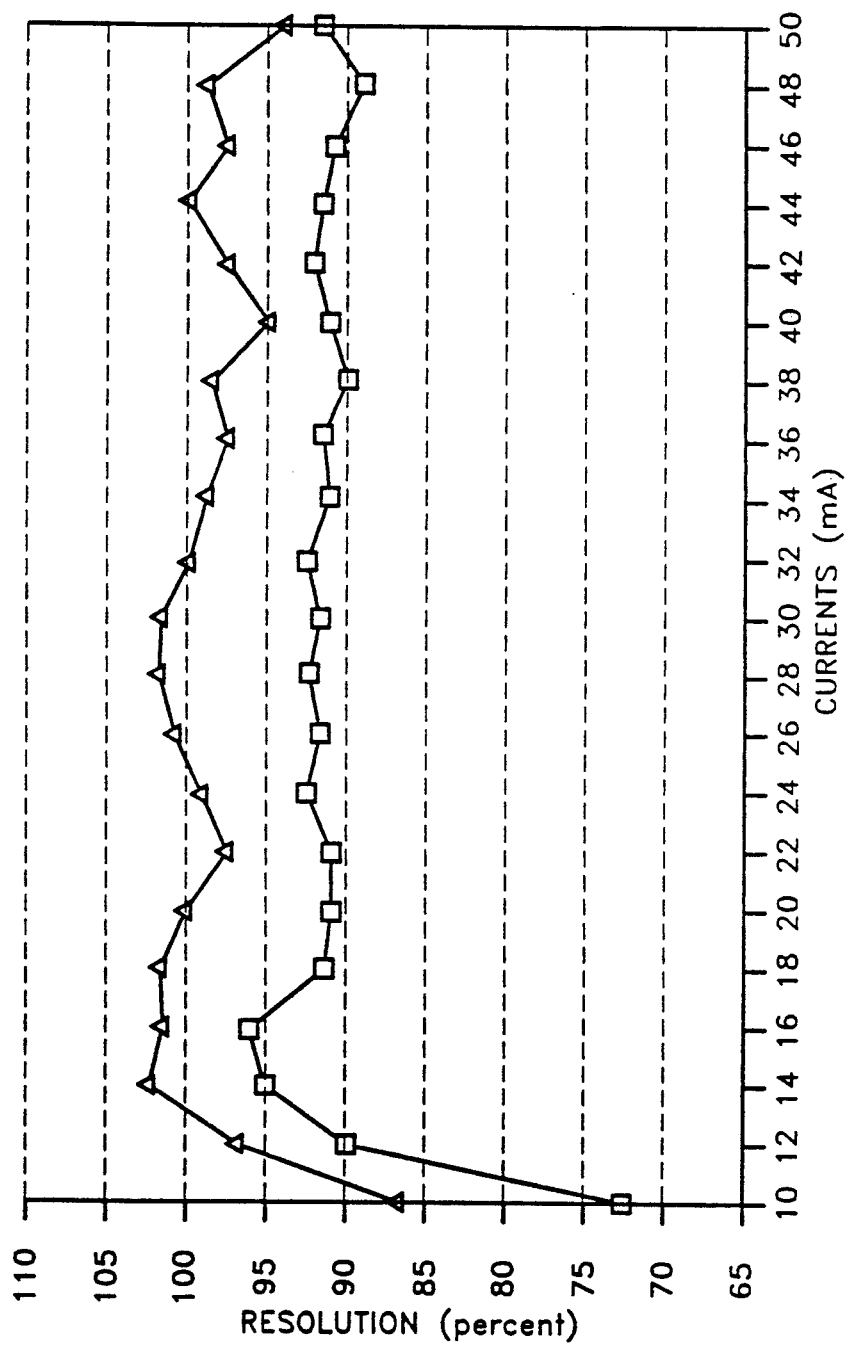
FIG. 8 is a graphical representation illustrating an improvement in resolution wherein the output voltage in FIG. 6 is divided by the output voltage of FIG. 7 for a given input current.

FIG. 8 is a graphical representation illustrating an improvement in resolution wherein the output voltage in FIG. 6 is divided by the output voltage of FIG. 7 for a given input current. The higher the percentage indicates the better resolution. The ferrite capped magnetic head slider in accordance with the present invention shows better resolution than the conventional head slider.

Figure 9:
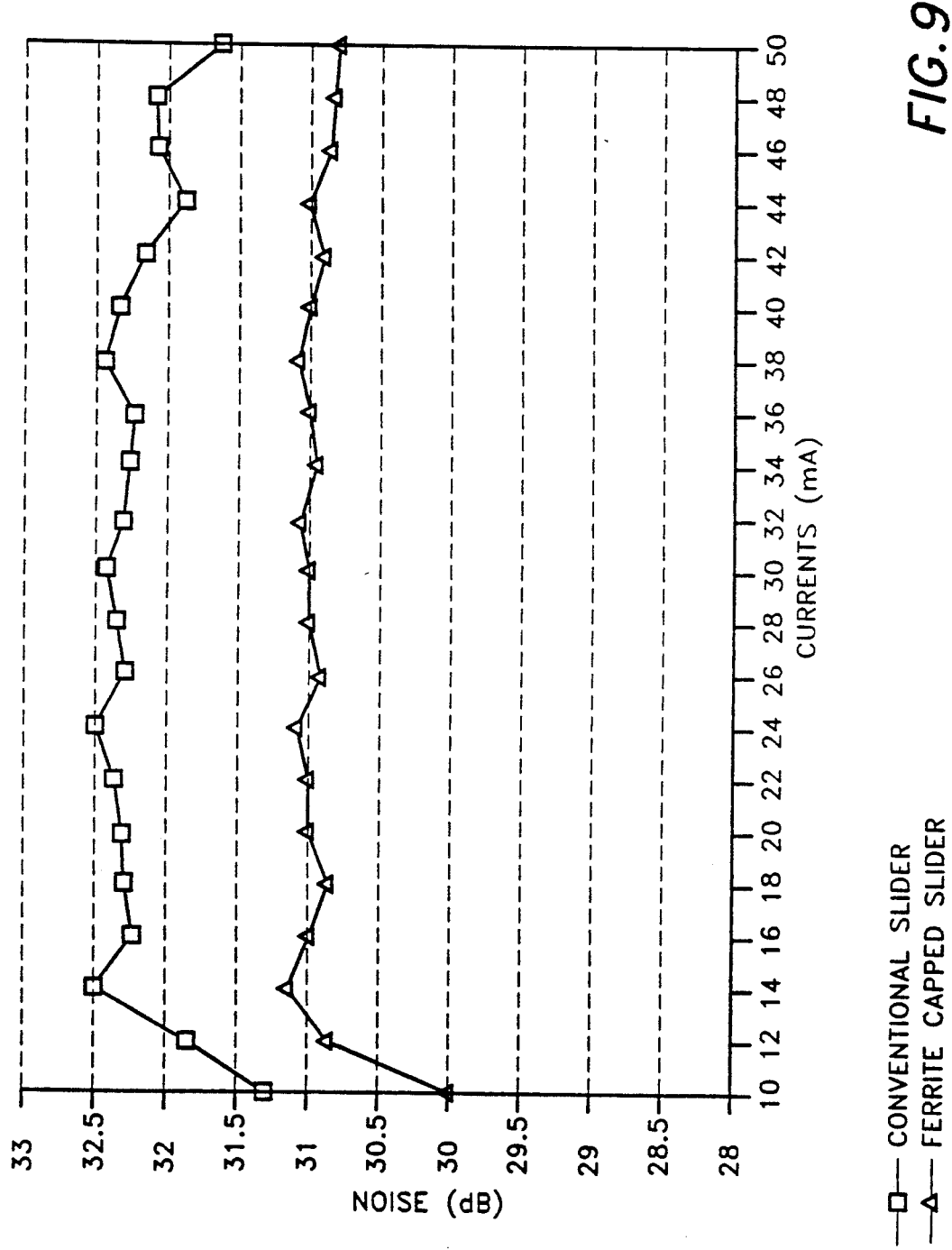
FIG. 9 is a graphical representation illustrating an improvement in noise reduction wherein the head noise is measured after read/write tests.

FIG. 9 is a graphical representation illustrating a comparison in noise level between the ferrite capped magnetic head in accordance with the present invention and the conventional magnetic head wherein the head noise is measured after read/write tests. Since the ferrite cap in the present invention acts as a magnetic shield for the magnetic head system, the noise level is significantly lower than that of the conventional magnetic head.

Figure 10:
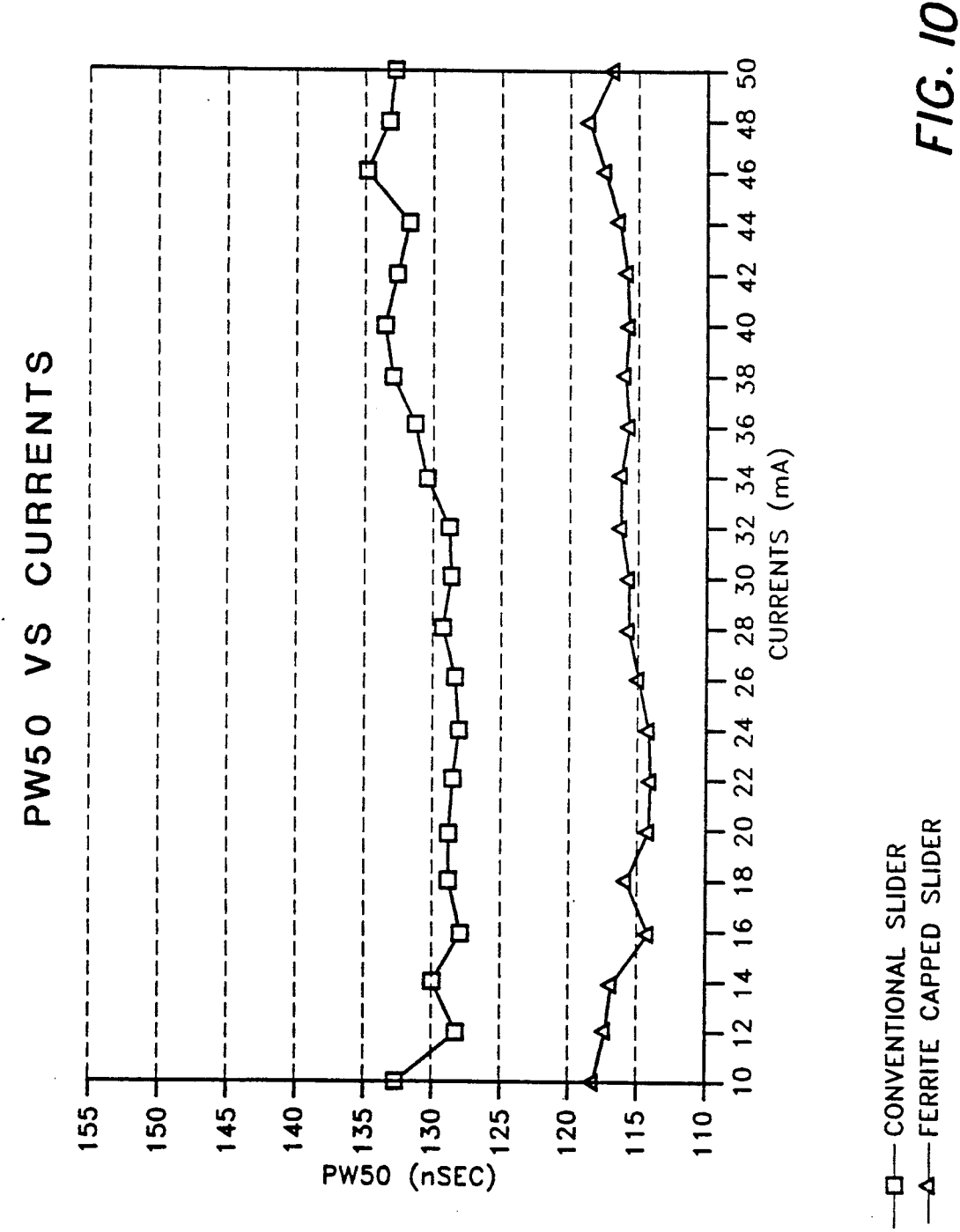
FIG. 10 is a graphical representation illustrating an improvement in sharpness of an isolated output pulse generated by the head.

FIG. 10 is a graphical representation illustrating an improvement in sharpness of an isolated pulse generated by the head. The pulse width at 50% amplitude of the output signal from the head is measured and the lower the number shows the better sharpness. As illustrated in FIG. 12, the ferrite capped head slider in accordance with the present invention shows significantly better performance than that of the conventional head slider.

Although not shown, other tests such as "Bit Shift," a measurement of the head's ability to write a signal within a drive determined window of time, tests also show the better performance of the ferrite head slider in accordance with the present invention. In the bit shift test, the head driver will look for a signal on a given section of the disk. If the head is operating properly, the signal it writes will fall in the center of this section. Bit shift is a measurement of how far away the signal is from this nominal time. Therefore, the lower the shift time indicates the better performance.

Figure 11A:
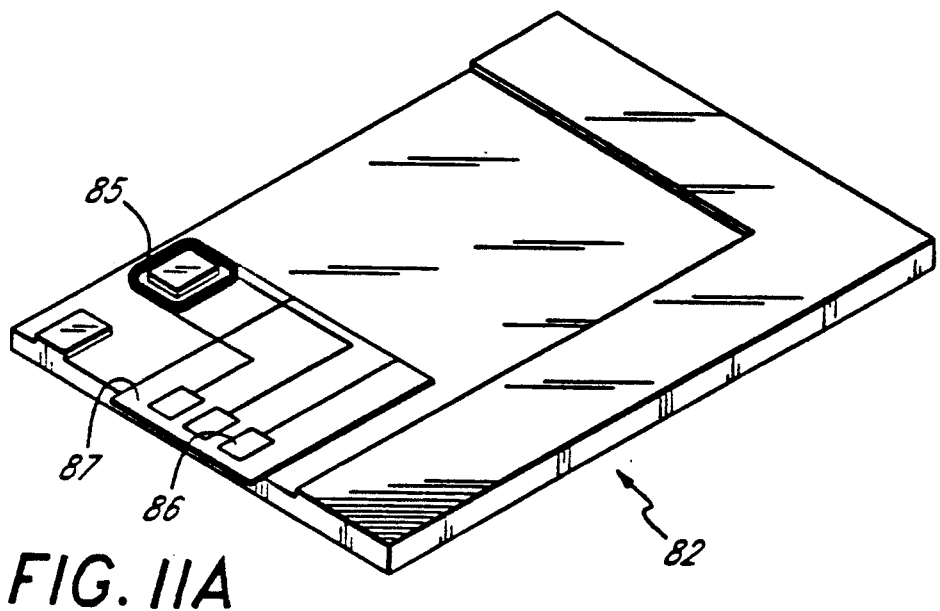
FIG. 11A is a perspective view of a magnetic head slider in accordance with an alternative embodiment of the present invention.
Figure 11B:
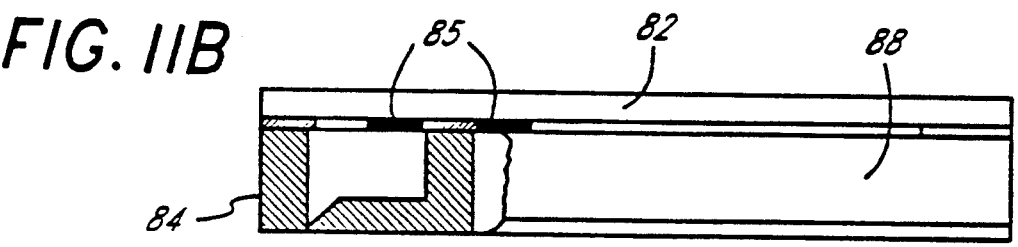
FIGS. 11B and 11C are side views of different slider embodiments.
Figure 11C:
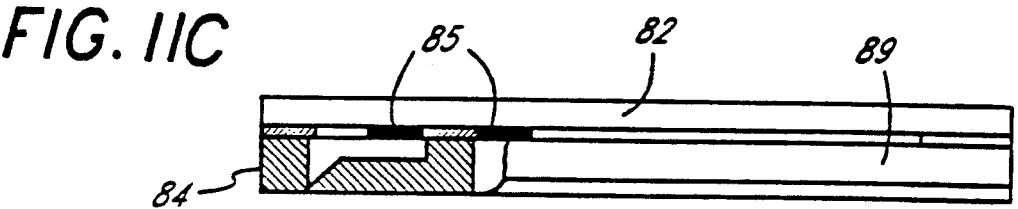

FIGS. 11A, 11B and 11C show another preferred embodiment in accordance with the present invention. In this example, the use of a wire-wound coil is entirely eliminated by using thin film or thick film techniques. On the ferrite cap 82 of FIG. 11A (which is identical to the cap discussed above, except as noted), a film coil 85 is provided around one of the projections. For example, the film coil 85 can be deposited directly on the ferrite cap 82 by the thin film or thick film process. Alternatively, a groove is etched in the vicinity of one of the projections and subsequently filled with insulating materials such as glass. Then the coil is deposited on the surface of the glass depending on the numbers of turns required. The deposited coil 85 is connected to a flexible circuit connector 87 having conductive plates 86 with wire leads. The flexible circuit connector 87 is well known and commonly used in the art. It is also possible to replace the flexible circuit connector 87 with a thin film circuit by directly depositing conductor material on the ferrite cap 82.

The film coil thus produced is extremely thin so that the height of the partial core 84 can be substantially reduced and thus the height of the head slider can be also substantially reduced. FIG. 11B is a side view of the magnetic head slider having a film coil and having a standard size of the slider body 88 of the Winchester disk drive. FIG. 11C is a side view of the magnetic head slider in accordance with the second embodiment of the present invention. As shown in the drawing, the winding window is greatly reduced, to for example 0.003 inches, which in turn allow for significantly reduced height of the slider body 89. As shown in FIG. 1, the present slider configuration is such that during the lapping of the bottom surfaces of the air bearing portions 18a and 18b, the air bearing portion 18b proximate the coil 11 includes a triangular cutout providing access to the winding window of the coil 11. Since the slider body 12 is solid adjacent the air bearing portion 18a distal the coil 11, this air bearing portion 18a is better able to resist the forces exerted on the slider during the lapping of the bottom surfaces of the air bearing portions 18a, 18b. Eventually, as the slider decreases in height through the use of the thin film coils, the virtual elimination of the winding window will result in the virtual elimination of the triangular cutout so that the resistance of the air bearing portions 18a, 18b of the slider during the creation of the air bearing surfaces will be substantially uniform, thereby resulting in improved flatness of the air bearing surfaces.

Although the invention has been described in terms of the preferred embodiment, other embodiments that are apparent to those of ordinary skill in the art are also within the scope of the invention. Accordingly, the scope of the invention is intended to be defined only by reference to the appended claims.

I claim:

1. A method of making a magnetic head slider system, comprising:
    forming a hollow tube of generally rectangular cross-section from a generally C-shaped bar of magnetically conductive material and a generally I-shaped bar of magnetically conductive material, wherein the junction between the front of said bars forms a front gap and the junction between the back of said bars forms a back gap;
    removing all of the back of said hollow tube at or above said junction between said back of said bars forming said back gap to form a generally U-shaped bar;
    slicing said U-shaped bar into a series of U-shaped partial cores including a generally I-shaped portion defining a top surface and a generally L-shaped portion having a horizontal section and a vertical section, said vertical section defining a top surface;
    mounting at least one of said series of partial cores on a slider body having an upper surface, a lower surface, a leading edge and a trailing edge;
    mounting a pre-wound coil of electrically conductive material around one of said portions;
    mounting a substantially solid cap sized and shaped to conform to the peripheral shape of said slider body to shield said upper surface of said slider body from magnetic flux, having an upper surface and a lower surface, on said upper surface of said body so that said lower surface of said cap directly contacts said top surface of said I-shaped portion and said top surface of said vertical section of said L-shaped portion, thereby forming a continuous core from said horizontal section of said L-shaped portion to said horizontal section of said I-shaped portion around said front gap; and
    securing said upper surface of said cap to a suspension assembly connected to an actuator for suspending said slider adjacent a rotating magnetic medium.

2. The method of claim 1, wherein said lower surface of said cap includes a first depending projection defining a first bottom surface corresponding in size and shape to said top surface of said I-shaped portion and said lower surface of said cap includes a second depending projection defining a second bottom surface corresponding in size and shape to said top surface of said L-shaped portion, further comprising the step of mounting said first bottom surface directly against said stop surface of said I-shaped portion and mounting said second bottom surface directly against said top surface of said L-shaped portion.

3. The method of claim 2, further comprising the step of lapping said top surface of said I-shaped portion, said top surface of said L-shaped portion, said first bottom surface and said second bottom surface.

4. The method of claim 1, wherein said removing step includes removing enough of said back of said hollow tube that the top portion of said L-shaped portion of said generally U-shaped bar has a constant cross-section.

5. A method of making a magnetic head slider system, comprising:

forming a hollow tube of generally rectangular cross-section from a generally C-shaped bar of magnetically conductive material and a generally I-shaped bar of magnetically conductive material, wherein the junction between the front of said bars forms a front gap and the junction between the back of said bars forms a back gap;

removing all of the back of said hollow tube at or above said junction between said back of said bars forming said back gap to form a generally U-shaped bar;

slicing said U-shaped bar into a series of U-shaped partial cores including a generally I-shaped portion and a generally L-shaped portion having a horizontal section and a vertical section, said vertical section defining a top surface;

mounting at least one of said series of partial cores on a slider body having an upper surface, a lower surface, a leading edge and a trailing edge;

mounting a substantially solid cap sized and shaped to conform to the peripheral shape of said slider body to shield said upper surface of said slider body from magnetic flux, having an upper surface and a lower surface, said lower surface of said cap having a projection defining a first are and a second projection defining a second area, on said upper surface of said body so that said first area of said cap directly contacts said top surface of said I-shaped portion and said second area of said cap directly contacts said top surface of said vertical section of said L-shaped portion, thereby forming a continuous core from said horizontal section of said L-shaped portion to said I-shaped portion around said front gap, said upper surface of said cap defining an area for connecting said slider to a suspension assembly connected to an actuator for suspending said slider adjacent a rotating magnetic medium; and depositing a film coil on said cap around one of said areas prior to said mounting of said cap on said body.

6. The method of claim 2, wherein said lower surface of said cap further comprises a raised area of substantially the same height as said first and second projections, positioned distal from said projections to prevent said cap from rocking from end to end or side to side about said lower surface of said cap and said top surface of said slider body.

7. The method of claim 6, wherein said raised area and said first and second projections form a cavity between said lower surface of said cap and said top surface of said slider body for the placement of an adhesive to secure said cap to said slider body.

8. The method of claim 1, wherein said bottom surface of said slider body defines an air-bearing surface comprising a plurality of ribs extending in a direction corresponding to the direction of rotation of said magnetic medium.

* * * * *

UNITED STATES PATENT AND TRADEMARK OFFICE
CERTIFICATE OF CORRECTION

PATENT NO. : 5,210,929
DATED : May 18, 1993
INVENTOR(S) : von Heune, et al

It is certified that error appears in the above-indentified patent and that said Letters Patent is hereby corrected as shown below:

Claim 2, Column 10, Line 61, please replace "against said stop" with -- against said top --;

Signed and Sealed this

Twenty-ninth Day of April, 1997

Attest:

BRUCE LEHMAN

Attesting Officer

Commissioner of Patents and Trademarks